(12) United States Patent
Mentens et al.

(10) Patent No.: US 11,309,896 B2
(45) Date of Patent: Apr. 19, 2022

(54) RECONFIGURABLE LOGIC CIRCUIT

(71) Applicants: KATHOLIEKE UNIVERSITEIT LEUVEN, Leuven (BE); ECOLE POLYTECHNIQUE FÉDÉRALE DE LAUSANNE (EPFL), Lausanne (CH); UNIVERSITÀ DELLA SVIZZERA ITALIANA, Lugano (CH)

(72) Inventors: Nele Mentens, Diest (BE); Francesco Regazzoni, Canobbio (CH); Edoardo Charbon, Jouxtens-Mezery (CH)

(73) Assignees: KATHOLIEKE UNIVERSITEIT LEUVEN, Leuven (BE); UNIVERSITÀ DELLA SVIZZERA ITALIANA, Lugano (CH); ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/766,170

(22) PCT Filed: Nov. 19, 2018

(86) PCT No.: PCT/EP2018/081673
§ 371 (c)(1),
(2) Date: May 21, 2020

(87) PCT Pub. No.: WO2019/101660
PCT Pub. Date: May 31, 2019

(65) Prior Publication Data
US 2020/0366294 A1    Nov. 19, 2020

(30) Foreign Application Priority Data
Nov. 22, 2017   (GB) ...................... 1719355

(51) Int. Cl.
| | | |
|---|---|---|
| *H03K 19/17768* | (2020.01) |
| *H03K 19/20* | (2006.01) |
| *H04L 9/06* | (2006.01) |

(52) U.S. Cl.
CPC ....... *H03K 19/17768* (2013.01); *H03K 19/20* (2013.01); *H04L 9/0618* (2013.01)

(58) Field of Classification Search
CPC . H03K 19/17768; H03K 19/20; H04L 9/0618
See application file for complete search history.

(56) References Cited

U.S. PATENT DOCUMENTS 6,140,839 A * 10/2000 Kaviani ........... H03K 19/17728
326/39
2007/0186203 A1   8/2007 Sueyoshi et al.
(Continued)

OTHER PUBLICATIONS

Motoki Amagasaki, Ryoichi Yamaguchi, Masahiro Koga, Masahiro Iida, Toshinori Sueyoshi, "An Embedded Reconfigurable IP Core with Variable Grain Logic Cell Architecture", International Journal of Reconfigurable Computing, vol. 2008, Article ID 180216, 14 pages, 2008 (Year: 2008) (Year: 2008).*
(Continued)

*Primary Examiner* — Seokjin Kim
(74) *Attorney, Agent, or Firm* — Workman Nydegger

(57) ABSTRACT

A reconfigurable logic circuit comprises first, second and third switching circuits arranged for receiving first, second and third input bits, respectively, and each arranged for being configured in a mode wherein the corresponding input bit is passed on or in a mode; a first exclusive OR logic block operable on the outputs of the first, second and third switching circuits and arranged to output a sum bit; fourth, fifth and sixth switching circuits arranged for receiving a fourth, fifth and sixth input bits and arranged for being configured in a mode; first, second and third AND logic blocks, each arranged for receiving a different pair of the outputs of
(Continued)

certain switching circuits; a second exclusive OR logic block operable on the outputs of certain AND logic blocks and arranged to produce a carry output bit.

13 Claims, 4 Drawing Sheets

(56) References Cited

U.S. PATENT DOCUMENTS

| | | |
|---|---|---|
| 2007/0241780 A1 | 10/2007 | Teig et al. |
| 2010/0183143 A1* | 7/2010 | Yamamoto ............ H04L 9/0625 380/28 |
| 2012/0191967 A1* | 7/2012 | Lin ........................ H04N 19/61 713/100 |

OTHER PUBLICATIONS

Amagasaki et al., "A Variable Grain Logic Cell Architecture for Reconfigurable Logic Cores", 2007 International Conference on Field Programmable Logic and Applications, IEEE, Aug. 27-29, 2007, pp. 550-553.

Cardarilli et al., "A Full-Adder Based Reconfigurable Architecture for Fine Grain Applications: ADAPTO", 2008 15th IEEE International Conference on Electronics, Circuits and Systems, IEEE, Aug. 31, 2008, pp. 1304-1307.

Elbirt et al., "An Instruction-Level Distributed Processor for Symmetric-Key Cryptography", IEEE Transactions on Parallel and Distributed Systems, vol. 16, No. 5, May 1, 2005, pp. 468-480.

International Search Report and Written Opinion from PCT Application No. PCT/EP2018/081673, dated Feb. 27, 2019.

Search Report from the corresponding GB Application No. GB1719355.8, dated May 21, 2018.

* cited by examiner

RECONFIGURABLE LOGIC CIRCUIT

FIELD OF THE INVENTION

The present invention is generally related to the field of configurable logic circuitry. More in particular, it relates to configurable logic circuits for use in cryptography.

BACKGROUND OF THE INVENTION

The capability of changing, at least to some extent, or updating the functionality of an electronic system after its deployment has always been desirable. In a typical system composed of hardware and software, such capability is usually guaranteed by software routines. Software, however, despite being extremely flexible, is much slower than its hardware counterpart (sometimes too slow to meet the requirements of the target application). Field Programmable Gate Arrays (FPGAs) have been proposed as a solution to achieve a performance comparable to a dedicated hardware implementation while maintaining the possibility of being updated and reconfigured in the field.

The first FPGAs consisted of lookup tables which were programmed by means of a configuration file generated according to the function to be implemented. Their use, at that time, was mainly for prototyping and testing designs before fabrication. Soon, however, FPGAs also started to be used as general purpose hardware platforms, since they were extremely suitable for addressing the need of low volume markets, reducing non-recurring engineering costs and allowing the user to access the latest technological nodes at a fraction of the ASIC cost. With the growth of the use of FPGAs as general purpose platforms came the need of having less generic reconfigurable hardware blocks, still capable to implement any design, but including specialized blocks for implementing recurring and relevant functions. As a result, FPGA cells started on the one side to include fast carry chains for arithmetic operations, Digital Signal Processing (DSP) blocks for signal processing and even more complex blocks, such as whole processors. On the other hand, the basic configurable cells evolved to become more and more efficient (SLICEM of Xilinx is a notable example, integrating logic, memory and shift register capabilities). This trend of improving the basic cells while extending the capacity of the specialized cells is certainly going to continue in the future.

Cryptography is one of the main applications that are often deployed on FPGAs. Cryptographic primitives, such as block ciphers, public-key algorithms and hash functions have been successfully implemented as stand-alone designs or as part of a complete system-on-chip. Dedicated circuits implementing physical(ly) unclonable functions (PUFs) or bit stream decryption blocks have been added to FPGAs by the vendors. The acceleration capabilities of FPGAs have also been used for realizing dedicated machines for breaking cryptographic algorithms. With the advent of side-channel attacks, FPGAs have been an attractive platform for implementing protected designs as well as for benchmarking the resistance against power analysis attacks.

In commercial FPGAs combinatorial functions are mapped onto lookup tables (LUTs) as already mentioned. A LUT is implemented as a multiplexer, that has the inputs of the LUT as selection signals and the configuration bits as data inputs. A LUT with n input bits and 1 output bit can be configured with $2^n$ configuration bits, such that the cell can hold $2^{\{2^n\}}$ different functions. This way, all types of applications can be mapped onto an FPGA. The FPGA typically further comprises additional logic for implementing fast adders and shift registers.

The paper "*An Instruction-Level Distributed Processor for Symmetric-Key Cryptography*" (A. Elbirt et al., IEEE Trans. Parallel and Distributed Systems, vol. 16, no. 5, May 2005, pp. 468-480) is concerned with a configurable hardware architecture on which block ciphers can be efficiently mapped, so that flexibility can be maintained through reconfiguration capabilities. The proposed solution is capable of high-speed on-the-fly configuration. The following operations are implemented as a part of the reconfigurable cryptographic processor core:

Bitwise XOR, AND or OR
Addition/subtraction modulo $2^8$, $2^{16}$, $2^{32}$
Fixed shift/rotation
Variable data-dependent rotation
Multiplication modulo $2^{16}$ and $2^{32}$ and squaring modulo $2^{32}$
Fixed-field constant multiplication in the Galois field $GF(2^8)$
Look-up table substitution of the forms:
4-bit to 4-bit with paging mode
8-bit to 8-bit
8-bit to 32-bit The proposed architecture allows for distributed processing across a 128-bit data path via four interconnected 32-bit data paths. Each 32-bit data path interconnects four so-called Reconfigurable Cryptographic Elements (RCEs) which form the basic building blocks. Some RCEs have an additional built-in functional unit allowing for the execution of modular multiplication and squaring. Each RCE operates upon a 32-bit data stream within a 128-bit block. Byte shufflers are provided to allow for bytewise permutations. Each RCE structure is capable of performing the above-mentioned functions.

When implementing algorithms on the COBRA architecture of Elbirt et al, the algorithms need to be described in a specific assembly code program. A dedicated complier maps the code onto the architecture. In terms of performance, one can generally state that the COBRA architecture does not reach higher throughput than commercial FPGAs. Further, the COBRA architecture requires more logical resources than commercial FPGA solutions.

In the paper '*A full-adder based reconfigurable architecture for fine grain applications: ADAPTO*' (Cardarelli et al., IEEE Int'l Conf. on Electronics, Circuits and Systems, pp. 1304-1307, May 2008) a reconfigurable architecture wherein LUTs are replaced by another computational element and a simple interconnect network is adopted, is given more flexibility. By use of full-adder based logic blocks an increased hardware efficiency is obtained as well as a reduction of the number of reconfiguration bits. However, the multiplexers in the computational elements introduce a significant overhead in computational resources. Further, the structure in which the computational elements are placed only allows limited connections of the cells through routing, which restricts the architecture.

The paper '*A Variable Grain Logic Cell Architecture for Reconfigurable Logic Cores*' (Amagasaki et al., IEEE Int'l Conf. on Field Programmable Logic and Applications, pp. 550-553, August 2007) concentrates on the higher-level cell architecture. It proposes a technology mapping method to obtain a variable granularity.

US2007/186203 presents a reconfigurable logic block with a first circuit to configure an arithmetic circuit and a second circuit to configure a circuit outside of the arithmetic circuit. Various circuits are configured by changing the settings of predetermined signals in the first and second circuits.

Consequently, there is a need for a reconfigurable cell wherein the prior art limitations are avoided or overcome.

SUMMARY OF THE INVENTION

It is an object of embodiments of the present invention to provide for a reconfigurable logic circuit having an architecture adapted for offering flexibility while being moderate in area requirements and competitive in terms of throughput. It is a further object to provide a reconfigurable cell on which a tool flow can be applied that accepts regular HDL code to be mapped onto the cell architecture.

The above objective is accomplished by the solution according to the present invention.

In a first aspect the invention relates to a reconfigurable logic circuit comprising a first, second and third switching circuit arranged for receiving a first input bit, a second input bit and a third input bit, respectively, and each arranged for being configured in a mode wherein the corresponding input bit is passed on or in a mode wherein a fixed logical zero or one is passed on, a first exclusive OR logic block operable on the outputs of said first, second and third switching circuit and arranged to output a sum bit, a fourth, fifth and sixth switching circuit arranged for receiving a fourth input bit, a fifth input bit and a sixth input bit and arranged for being configured in a mode wherein the corresponding input bit is passed on or in a mode wherein a fixed logical zero or one is passed on, a first, second and third AND logic block, each arranged for receiving a different pair of the outputs of said fourth, fifth and sixth switching circuit, a second exclusive OR logic block operable on the outputs of said first, second and third AND logic block and arranged to produce a carry output bit.

The proposed solution indeed allows for a lot of flexibility. By providing a switching circuit for each input bit, various logical functions can be implemented. Both the resulting sum bit and the carry output bit can indeed be written as a logical expression containing several bits that can be set to configure a desired logical function.

In a preferred embodiment at least one of the switching circuits is implemented with an AND logic block arranged for receiving the corresponding input bit and a first configuration bit and a OR logic block arranged for receiving the output of the AND logic block and a second configuration bit. Most preferably all switching circuits of the reconfigurable cell are implemented like that.

In an advantageous embodiment the first and the fourth switching circuit have their second configuration bit set to a logical 0, the third and sixth switching circuit have their first configuration bit set to a logical 1 and the second and fourth switching circuit have their first configuration bit set to a logical 1 and their second configuration bit set to a logical 0.

In another preferred embodiment the order of the AND logic block and said OR logic block in the switching circuit is reversed, whereby the output of the OR logic block is arranged to be fed to the AND logic block.

In embodiments of the invention the switching circuits are configurable for implementing one or more of the following functions: an addition modulo $2^n$, an addition modulo 2 or a substitution box.

In preferred embodiments the switching circuits are arranged to implement a quadratic function. This allows for threshold implementations suitable for protecting the reconfigurable logic circuit against differential power attacks.

In one aspect the invention relates to a slice comprising one or more reconfigurable logic circuits as previously described.

In embodiments each of the one or more reconfigurable logic circuits of the slice has a corresponding flipflop to which at least either the sum bit or the carry output bit can be applied. The slice further comprises multiplexers.

Advantageously, the slice comprises exactly four reconfigurable logic circuits as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
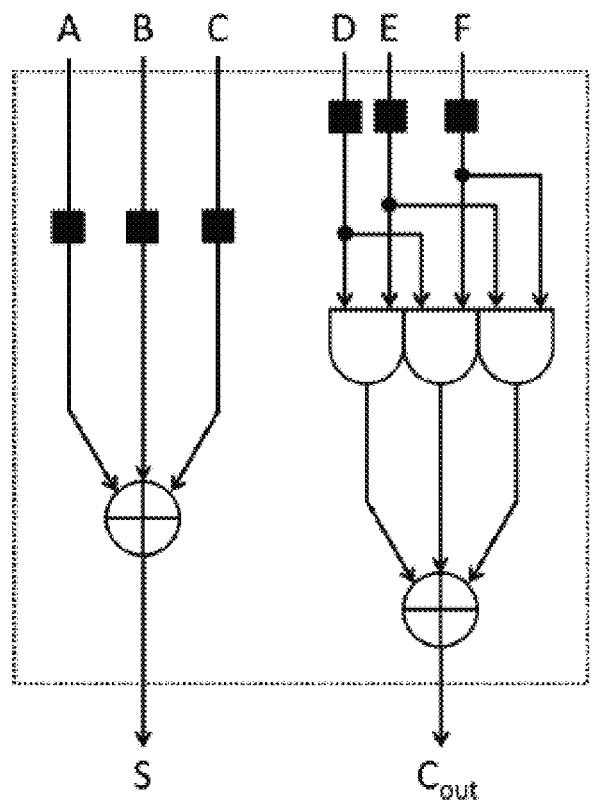
FIG. 1 illustrates a generic scheme of the reconfigurable logic circuit of the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Envisioning that the next application-specific block to be included on FPGAs will be devoted to cryptography, this invention proposes the design of a new reconfigurable logic circuit conceived specifically for efficiently implementing cryptographic algorithms. In this invention block ciphers are considered, covering various possible constructions (substitution-permutation networks (SPN), addition, rotation and XOR (ARX) based ciphers, Feistel and stream-cipher-like ciphers). Also considered are threshold implementations of block ciphers, which offer side-channel protection. FPGA designers consider cryptography as the next application, observing what happened in processor designs, where, after the basic instructions, designers added in sequence instructions for arithmetic operations (which have been already added to FPGAs) and instructions for signal processing (which have been already added to FPGAs). Instructions for cryptography, however, have not been added to FPGAs yet.

The proposed fine-grained reconfigurable logic circuit, in this description often also referred to as a reconfigurable cell, is a configurable full-adder-based cell, with a number of configuration bits for programming the functionality. The cell can be configured to implement basic arithmetic logic functions which are then combined to implement certain circuit functionality. The cell structure is designed to easily map the basic transformations present in state-of-the-art block ciphers and is also extremely suitable for implementing algorithmic countermeasures against side-channel analysis, such as threshold implementations.

The proposed cell can be used as a small, crypto-friendly reconfigurable hardware block to be included as a new type of cell, together with other reconfigurable cells, in a next generation of FPGAs. Another possible application is for example as a small embedded FPGA (eFPGA) to be added to an ASIC design or a microprocessor to maintain and support so-called cryptographic agility, which is a fundamental requirement for the current and future generation of Internet of Things (IoT) devices and cyber-physical systems.

Cryptographic algorithms used to ensure confidentiality fall within one of two categories: private-key (also known as symmetric-key) and public-key. Symmetric-key algorithms use the same key for both encryption and decryption. Conversely, public-key algorithms use a public key for encryption and a private key for decryption. In a typical session, a public-key algorithm is used for the exchange of a session key and to provide authenticity through digital signatures. The session key is then used in conjunction with a symmetric-key algorithm. Symmetric-key algorithms tend to be significantly faster than public-key algorithms and as a result are typically used in bulk data encryption. The two types of symmetric-key algorithms are block ciphers and stream ciphers. Block ciphers operate on a block of data while stream ciphers encrypt individual bits. Block ciphers are typically used when performing bulk data encryption and the data transfer rate of the connection directly follows the throughput of the implemented algorithm.

To boost the performance of symmetric-key algorithms while maintaining agility for cryptographic algorithms, a configurable cell needs to be designed that is smaller and faster than a LUT and uses less configuration bits. The newly proposed reconfigurable logic circuit should allow existing and future symmetric-key algorithms to be efficiently mapped onto an architecture that comprises an array of the new logic circuits.

Focus is in the first place on block ciphers. Most block ciphers can be categorized into SPN-based ciphers, ARX-based ciphers, stream-cipher-like ciphers and Feistel-based ciphers. The most frequently occurring operations in these ciphers are
1. bit permutation,
2. rotation
3. addition modulo $2^n$ (in ARX-based ciphers),
4. addition modulo 2, i.e. exclusive OR (XOR),
5. substitution box (S-box).

The first two operations in this list are in hardware architectures implemented through routing, while the last three operations require combinatorial logic.

Further, the threat of side-channel attacks (SCA) should be taken into account. Secret information is thereby extracted through side-channels such as the power consumption, the electromagnetic radiation or the timing behaviour of the chip. Threshold implementations provide a provably secure way to protect a circuit against Differential Power Analysis (DPA) attacks of a specific order. In a threshold implementation the linear parts of a block cipher are repeated according to the number of shares. The non-linear parts are usually expressed in terms of quadratic functions with pipelining registers in between, in order to minimize the number of required shares. Taking threshold implementations into account, a sixth item is added to the list of commonly used operations in block ciphers, namely:

6. quadratic functions (for the construction of threshold implementations of substitution boxes)

When analyzing the logic needed for the implementation of the listed operations, it turns out that operations 4 to 6 can be expressed in terms of quadratic functions. As an example, the algebraic normal form (ANF) of the function f is given: $GF(2)^4 \rightarrow GF(2)$:

$$f(x,y,z,w) = a_0 \oplus a_1 x \oplus a_2 y \oplus a_3 z \oplus a_4 w \oplus a_{12} xy \oplus a_{13} xz \oplus a_{14} xw \oplus a_{23} yz \oplus a_{24} yw \oplus a_{34} zw, \quad (1)$$

in which the inputs x, y, z and w as well as the coefficients $a_i$ and $a_{ij}$ are elements of GF(2), taking two possible values 0 or 1. Both the additions (denoted by $\oplus$) and the multiplications in the equation are in GF(2), i.e. the addition is an XOR and the multiplication is a logical AND.

Operation 3 in the above list of frequent operations is the addition of two n-bit numbers, in which the $(n+1)^{th}$ bit of the sum is omitted. The straightforward way of implementing the addition, is through a ripple-carry adder, comprising a sequence of full adders. A full adder has three inputs (A, B and $C_{in}$) and computes a sum output (S) and a carry output ($C_{out}$) as follows:

$$S = A \oplus B \oplus C_{in},$$

$$C_{out} = AB + (A+B)C_{in}. \quad (2)$$

whereby the + operator denotes a logical OR.

An adequate configurable cell should hence efficiently implement Eqs. (1) and (2). It is further observed that the carry computation in Eq. (2) can be rewritten as a quadratic function in ANF as follows:

$$C_{out} = AB \oplus BC_{in} \oplus AC_{in}. \quad (3)$$

Taking this into account, one sees that all terms in Eq. (1) can be generated by full adders, except for the constant term $a_0$. Therefore, it was decided to use the full adder as a basis for the new configurable cell.

Figure 2:
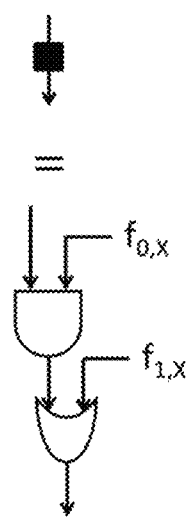
FIG. 2 illustrates an implementation of a switching circuit used for each of the six input bits in FIG. 1.

A general scheme of the architecture of the proposed reconfigurable logic circuit is shown in FIG. 1. One immediately recognizes on the left hand side a full adder structure with three inputs to determine the sum bit S. This sum circuit computes the sum (S) of the input bits A, B and C. For each of the three input bits a switching circuit is provided. For each input bit two configuration bits determine whether the bit is fed through or absorbed, such that a 0 or a 1 is applied to the circuit. An implementation of such a switching circuit is illustrated in FIG. 2. For an input bit in it yields at its output a bit out given by $$out = f_{1,X} + in \cdot f_{0,X}$$

whereby $f_{0,X}$ and $f_{1,X}$ denote configuration bits and the '+' operator represents a logical OR.

This gives the following logic table:

TABLE 1

| in | $f_{0,X}$ | $f_{1,X}$ | out |
|----|-----------|-----------|-----|
| 0  | 0         | 0         | 0   |
| 0  | 0         | 1         | 1   |
| 0  | 1         | 0         | 0   |
| 0  | 1         | 1         | 1   |
| 1  | 0         | 0         | 0   |
| 1  | 0         | 1         | 1   |
| 1  | 1         | 0         | 1   |
| 1  | 1         | 1         | 1   |

From the table can easily be seen that in certain cases (i.e. when $f_{0,X}=1$ and $f_{1,X}=0$) the in bit is just passed on, whereas in other cases a fixed logical value is obtained at the switching circuit output. When $f_{1,X}=1$, this fixed value is a logical '1'. When both $f_{0,X}=0$ and $f_{1,X}=0$, a fixed logical '0' is obtained.

The outputs of the three switching circuits are then applied to the XOR block to produce the sum bit S.

On the right hand side in FIG. 1 there is also a full adder structure to form the carry circuit that computes the carry-out from the input bits D, E and F. Again there is a switching circuit for each of the three input bits D, E, F. The switching circuits have the same structure as described above. Again there are two configuration bits for each input bit. The outputs of the three switching circuits are pairwise applied to one of the three logical AND gates. The outputs of the AND gates are then fed into the logical XOR block to produce the carry output bit $C_{out}$.

The full expressions for the sum bit S and the carry output bit $C_{out}$ for the embodiment of FIG. 1 are given by $$S = (f_{1,A} + f_{0,A} A) \oplus (f_{1,B} + f_{0,B} B) \oplus (f_{1,C} + f_{0,C} C)$$

and $$C_{out} = (f_{1,D} + f_{0,D} D)(f_{1,E} + f_{0,E} E) \oplus (f_{1,D} + f_{0,D} D)(f_{1,F} + f_{0,F} F) \oplus (f_{1,E} + f_{0,E} E)(f_{1,F} + f_{0,F} F).$$

whereby $f_{1,A}$ and $f_{0,A}$ denote the two configuration bits in the path of A, $f_{1,B}$ and $f_{0,B}$ the two configuration bits in the path of input bit B, and so on. The resulting configurable cell has 12 configuration bits. The sum circuit and the carry-out circuit can each be configured to $3^3$ functions.

Figure 3:
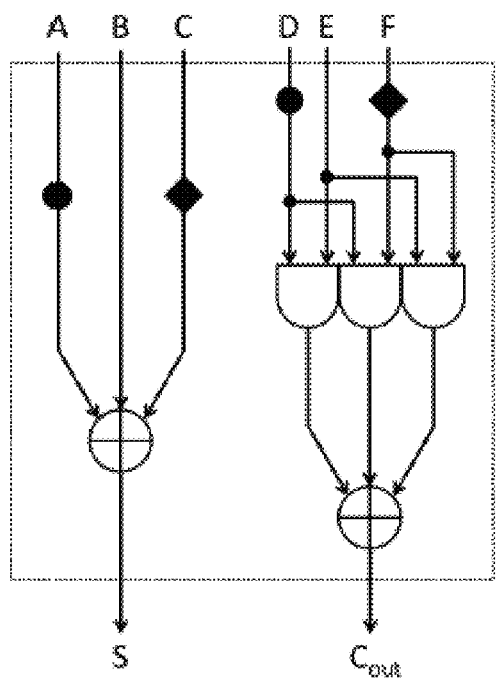
FIG. 3 illustrates a preferred embodiment of the reconfigurable logic circuit of this invention.
Figure 4:
FIG. 4 illustrates the switching circuits used in FIG. 3 and obtained by giving certain configuration bits a fixed value.

A preferred embodiment of the reconfigurable logic circuit of the invention is shown in FIG. 3. This scheme is derived from the circuit of FIG. 1 by giving certain configuration bits a predetermined fixed value. In the sum circuit the configuration bit $f_{1,A}$ is set to equal to 0 and configuration bit $f_{0,C}$ equals a logical 1. In the carry-out circuit the configuration bit $f_{1,D}$ is set to equal to 0 and configuration bit $f_{0,F}$ equals a logical 1. FIG. 4 shows the resulting switching circuits. In the switching circuits for the input bits B and E the configuration bit $f_{0,X}$ has been set equal to 1 and configuration bit $f_{1,X}$ equal to 0.

In the embodiment of FIG. 3 the area, the combinatorial delay and the number of configuration bits are optimized. Reducing the number of configuration bits has been done by observing that in FIG. 1 several combinations of the configuration bits lead to the same function, because the reconfigurable cell is symmetric in both the sum and the carry-out computation. Therefore, it is not necessary to foresee both an AND and an OR gate for each input bit. Providing one input with an AND gate and another one with an OR gate for both the sum and the carry-out circuits leads to a reduction of the number of configuration bits as well as a reduction in the logical delay and the area of the cell. This way, the number of configuration bits is reduced from 12 to 4. The eight functions that can be obtained, are given in the following Table 2:

TABLE 2

| $f_{0,A}$ | $f_{1,C}$ | S |
|---|---|---|
| 0 | 0 | $0 \oplus B \oplus C$ |
| 0 | 1 | $0 \oplus B \oplus 1 = \overline{B}$ |
| 1 | 0 | $A \oplus B \oplus C$ |
| 1 | 1 | $A \oplus B \oplus 1 = \overline{A \oplus B}$ |

| $f_{0,D}$ | $f_{1,F}$ | $C_{out}$ |
|---|---|---|
| 0 | 0 | $0 \oplus 0 \oplus EF = EF$ |
| 0 | 1 | $0 \oplus 0 \oplus E = E$ |
| 1 | 0 | $DE \oplus DF \oplus EF = DF + (D + E)F$ |
| 1 | 1 | $DE \oplus D \oplus E = D + E$ | in which $\overline{X}$, XY, X+Y and X⊕Y denote an inversion, a logical AND, a logical OR and an XOR, respectively. Whereas the embodiment of FIG. 3 only has a slightly more limited functionality than the first, it yields a clear advantage over the implementation of FIG. 1 in terms of area and combinatorial delay.

Figure 5:
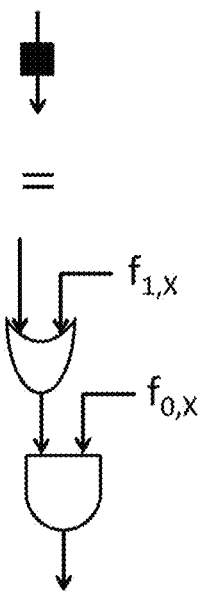
FIG. 5 illustrates an alternative implementation of a switching circuit that can be used for each of the six input bits in FIG. 1.

An alternative implementation of the switching circuits of FIG. 2 is shown in FIG. 5. The order of the AND logic block and OR logic block has been reversed compared to the implementation of FIG. 2. The output of the OR logic block now forms an input to the logic AND block. For an input bit in the switching circuit then yields at its output a bit out given by $$\text{out} = (\text{in} + f_{1,X}) \cdot f_{0,X}$$

whereby $f_{0,X}$ and $f_{1,X}$ denote the two configuration bits and the '+' and '·' operators represent a logical OR and AND, respectively. This expression gives rise to the logic table of Table 3:

TABLE 3

| in | $f_{1,X}$ | $f_{0,X}$ | out |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |

As before, in certain cases (i.e. when $f_{0,X}=1$ and $f_{1,X}=0$ in FIG. 5) the in bit is just passed on, whereas in other cases a fixed logical value is obtained at the switching circuit output. In order to obtain the preferred embodiment of FIG. 3, in the sum circuit the configuration bit $f_{1,A}$ is set to equal to 0 and configuration bit $f_{0,C}$ equals a logical 1. In the carry-out circuit the configuration bit $f_{1,D}$ is set to equal to 0 and configuration bit $f_{0,F}$ equals a logical 1. In the switching circuits for the input bits B and E the configuration bit $f_{0,X}$ has been set equal to 1 and configuration bit $f_{1,X}$ equal to 0.

The skilled person will readily understand that the switching circuits as shown in FIG. 2 or FIG. 5 may equally well be implemented with other logic circuitry, for example using logic NOR and/or logic NAND blocks as building blocks.

Figure 6:
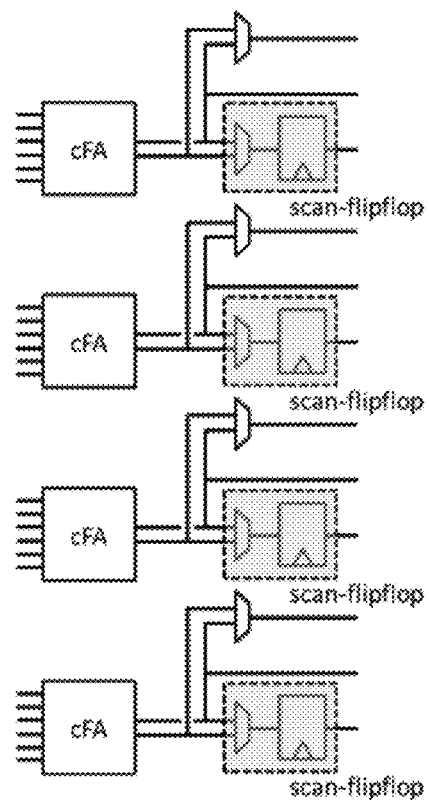
FIG. 6 illustrates an architecture of a slice combining four reconfigurable logic circuits and four flipflops.

In order to be able to reuse the routing capabilities of commercial FPGA design tools, the reconfigurable cell is integrated into a slice in combination with flipflops and multiplexers. The resulting slice is shown in FIG. 6. Each cell has an accompanying flipflop, which can be connected to either the S or the $C_{out}$ output of the cell. The combination of the multiplexer with the flipflop is implemented as a scan-flipflop. A slice has four configuration bits for each reconfigurable cell and one configuration bit for each multiplexer, which results in 24 configuration bits per slice.

Figure 7:
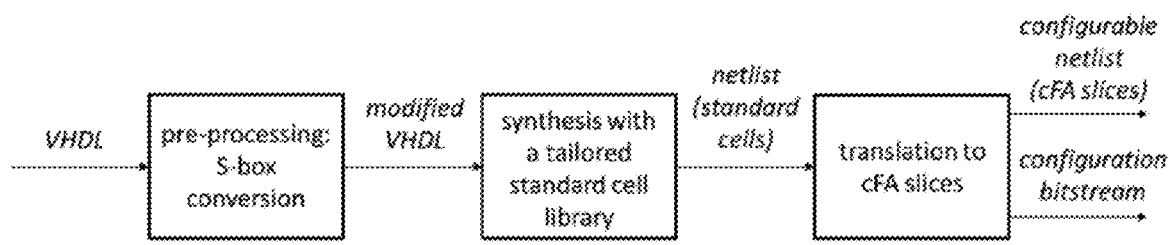
FIG. 7 illustrates a tool flow developed to automatically map VHDL designs onto an array of reconfigurable logic circuits according to the invention.

The tool flow developed to automatically map VHDL designs onto an array of reconfigurable logic circuits, is depicted in FIG. 7 and comprises three steps:
  modify the VHDL description such that all S-boxes are a composition of quadratic functions,
  synthesize the resulting VHDL design into a netlist that consists of standard cells from a tailored library,
  translate the netlist into a configurable netlist with reconfigurable logic cells and a configuration bit stream to be applied to the array of logic circuits.

Since the reconfigurable logic cell is especially suitable for the implementation of quadratic functions, the first step in the proposed tool flow translates all S-boxes into VHDL descriptions consisting of quadratic functions. This also holds for threshold implementations, in which pipelining registers are needed in between quadratic functions. Pipelining registers bound the propagation of glitches that could contain exploitable side-channel information and, consequently, reduce the number of required shares. In ARX-based designs, no preprocessing is needed, since the non-linear operation, i.e. the addition modulo $2^n$, is automatically translated into a ripple-carry adder (comprising full adders) in the next step, discussed below.

In the synthesis step the design is mapped onto an array of configurable logic cells using an ASIC synthesis tool. The functions listed in the above shown Table 2 are used to start from. A standard cell library is defined that contains these eight functions. Most existing standard cell libraries contain at least six of these eight functions. Only the A⊕B⊕C and DE+(D+E)F=DE⊕DF⊕EF functions are possibly not present in all standard cell libraries. In this case the standard cells that are not present, are added with the given functionality to the library, and all gates that are not in Table 2 are removed, except for the full adder gate and the D-flipflop. Since the eight functions in the table as well as the full adder are eventually mapped onto the gates of the reconfigurable cell, they all have the same area and delay in the resulting configurable array. Therefore, the area and the delay of these gates are modified in the library according to the values for the embodiment of the reconfigurable cell shown in FIG. 3.

The outcome is a netlist containing the eight gates in Table 2, a full adder gate and a D-flipflop. Since the four functions in the top part of Table 2 are independent of the four functions in the bottom part of the table, it is straightforward to merge any top-part function with any bottom-part function into one reconfigurable cell. However, inside a slice of reconfigurable cells, only one of the outputs can be connected to a flipflop, which is taken into account during the merge. The 24 configuration bits for each slice are combined into a configuration bit stream. This way, the output of this third step is a configurable netlist, i.e. a netlist consisting of only slices, and a configuration bit stream.

Because the slice has an interface that is similar to the interface of a Xilinx slice, the Xilinx tools for placement and routing can be re-used to transform the netlist of cFA slices into a placed and routed design. Therefore, the performance of the proposed architecture can be evaluated by mapping a hardware design to both the architecture of the reconfigurable cells and a Xilinx FPGA, comparing the resources and delay of the slices only, excluding routing. For the evaluated block ciphers, the proposed architecture results in a drastic reduction of the configurable resources and the number of configuration bits, while the delay (i.e. the critical path) is comparable. A comparison to Altera FPGAs gives similar results.

Operations like addition modulo $2^n$, addition modulo 2, substitution box and quadratic functions, for which the proposed configurable cell is designed, are also common in hash functions, authenticated encryption algorithms, public-key algorithms based on binary (extension) field arithmetic and in error-correcting codes. Therefore, these algorithms can efficiently be mapped onto the proposed architecture as well.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A reconfigurable logic circuit comprising:
    a first switching circuit arranged for receiving only a first input bit and at least one first configuration bit, a second switching circuit arranged for receiving only a second input bit and at least one second configuration bit, and a third switching circuit arranged for receiving only a third input bit and at least one third configuration bit, said switching circuits arranged for being configured in a mode wherein the corresponding input bit is passed on or in a mode wherein a fixed logical zero or one is passed on, by setting the corresponding at least one configuration bit,
    a first exclusive OR logic block operable on the outputs of said first, second and third switching circuit and arranged to output a sum bit,
    a fourth switching circuit arranged for receiving only a fourth input bit and at least one fourth configuration bit, a fifth switching circuit arranged for receiving only a fifth input bit and at least one fifth configuration bit, and a sixth switching circuit arranged for receiving only a sixth input bit and at least one sixth configuration bit, and arranged for being configured in a mode wherein the corresponding input bit is passed on or in a mode wherein a fixed logical zero or one is passed on, by setting the corresponding at least one configuration bit,
    a first, second and third AND logic block, each arranged for receiving a different pair of outputs formed from the outputs of said fourth, fifth and sixth switching circuit,
    a second exclusive OR logic block operable on the outputs of said first, second and third AND logic block and arranged to produce a carry output bit,
    wherein the configuration bits are provided for programming the functionality of the logic circuit relative to the input bits.

2. The reconfigurable logic circuit as in claim 1, wherein at least one of said switching circuits is implemented with an AND logic block arranged for receiving the corresponding input bit and the corresponding at least one configuration bit and a OR logic block arranged for receiving the output of said AND logic block and a further configuration bit of the corresponding at least one configuration bit.

3. The reconfigurable logic circuit as in claim 2, wherein all switching circuits are implemented with an AND logic block and OR logic block.

4. The reconfigurable logic circuit as in claim 3, wherein said first and said fourth switching circuit have their further configuration bit set to a logical 0, said third and sixth switching circuit have their at least one configuration bit set to a logical 1 and said second and fourth switching circuit have their at least one configuration bit set to a logical 1 and their further configuration bit set to a logical 0.

5. The reconfigurable logic circuit as in claim 2, wherein the order of said AND logic block and said OR logic block is reversed, whereby the output of said OR logic block is arranged to be fed to said AND logic block.

6. The reconfigurable logic circuit as in claim 1, wherein said switching circuits are configurable for implementing one or more of the following functions:
    an addition modulo 2n,
    an addition modulo 2, or
    a substitution box.

7. The reconfigurable logic circuit as in claim 1, wherein said switching circuits are arranged to implement a quadratic function.

8. A slice comprising one or more reconfigurable logic circuits as in claim 1.

9. The slice as in claim 8, wherein each of said one or more reconfigurable logic circuits has a corresponding flip-flop to which at least either said sum bit or said carry output bit can be applied.

10. The slice as in claim 8, further comprising multiplexing means.

11. The slice as in claim 8, comprising four reconfigurable logic circuits.

12. A reconfigurable logic circuit comprising:
    a first switching circuit arranged for receiving a first input bit and at least one first configuration bit, a second switching circuit arranged for receiving a second input bit and at least one second configuration bit, and a third switching circuit arranged for receiving a third input bit and at least one third configuration bit, said switching circuits arranged for being configured in a mode wherein the corresponding input bit is passed on or in a mode wherein a fixed logical zero or one is passed on, by setting the corresponding at least one configuration bit,
    a first exclusive OR logic block operable on the outputs of said first, second and third switching circuit and arranged to output a sum bit,
    a fourth switching circuit arranged for receiving a fourth input bit and at least one fourth configuration bit, a fifth switching circuit arranged for receiving a fifth input bit and at least one fifth configuration bit, and a sixth switching circuit arranged for receiving a sixth input bit and at least one sixth configuration bit, and arranged for being configured in a mode wherein the corresponding input bit is passed on or in a mode wherein a fixed logical zero or one is passed on, by setting the corresponding at least one configuration bit, a first, second and third AND logic block, each arranged for receiving a different pair of outputs formed from the outputs of said fourth, fifth and sixth switching circuit, a second exclusive OR logic block operable on the outputs of said first, second and third AND logic block and arranged to produce a carry output bit;

wherein each of the first, the second, the third, the fourth, the fifth and the sixth switching circuits are arranged for receiving only one input bit, wherein the configuration bits are provided for programming the functionality of the logic circuit relative to the input bits.

13. A reconfigurable logic circuit comprising:

a first switching circuit arranged for receiving a first input bit and at least one first configuration bit, a second switching circuit arranged for receiving a second input bit and at least one second configuration bit, and a third switching circuit arranged for receiving a third input bit and at least one third configuration bit, said switching circuits arranged for being configured in a mode wherein the corresponding input bit is passed on or in a mode wherein a fixed logical zero or one is passed on, by setting the corresponding at least one configuration bit, a first exclusive OR logic block operable on the outputs of said first, second and third switching circuit and arranged to output a sum bit, a fourth switching circuit arranged for receiving a fourth input bit and at least one fourth configuration bit, a fifth switching circuit arranged for receiving a fifth input bit and at least one fifth configuration bit, and a sixth switching circuit arranged for receiving a sixth input bit and at least one sixth configuration bit, and arranged for being configured in a mode wherein the corresponding input bit is passed on or in a mode wherein a fixed logical zero or one is passed on, by setting the corresponding at least one configuration bit, a first, second and third AND logic block, each arranged for receiving a different pair of outputs formed from the outputs of said fourth, fifth and sixth switching circuit, a second exclusive OR logic block operable on the outputs of said first, second and third AND logic block and arranged to produce a carry output bit;

wherein a number of switching circuits in the reconfigurable logic circuit is equal to a number of input bits, wherein the configuration bits are provided for programming the functionality of the logic circuit relative to the input bits.

* * * * *